(12) United States Patent
Du et al.

(10) Patent No.: US 10,605,694 B2
(45) Date of Patent: Mar. 31, 2020

(54) VIDEO MONITORING APPARATUS AND METHOD FOR OPERATING STATE OF WAVE MAKER

(71) Applicant: Dalian University of Technology, Dalian, Liaoning Province (CN)

(72) Inventors: Hai Du, Dalian (CN); Juan Meng, Dalian (CN); Muguo Li, Dalian (CN)

(73) Assignee: DALIAN UNIVERSITY OF TECHNOLOGY, Dalian, Liaoning (CN)

( * ) Notice: Subject to any disclaimer, the term of this patent is extended or adjusted under 35 U.S.C. 154(b) by 0 days.

(21) Appl. No.: 16/311,590

(22) PCT Filed: Sep. 8, 2017

(86) PCT No.: PCT/CN2017/101121
§ 371 (c)(1),
(2) Date: Dec. 19, 2018

(87) PCT Pub. No.: WO2018/166149
PCT Pub. Date: Sep. 20, 2018

(65) Prior Publication Data
US 2019/0204179 A1    Jul. 4, 2019

(30) Foreign Application Priority Data

Mar. 17, 2017 (CN) .......................... 2017 1 0159653

(51) Int. Cl.
*G01M 10/00* (2006.01)
*G06K 9/20* (2006.01)
(Continued)

(52) U.S. Cl.
CPC ............. *G01M 10/00* (2013.01); *B01L 3/508* (2013.01); *G06K 9/2018* (2013.01); *H04L 41/06* (2013.01);
(Continued)

(58) Field of Classification Search
CPC ........ G01M 10/00; H04L 41/22; H04L 41/06; H04N 7/18; H04N 7/183; B01L 3/508; G06K 9/2018
(Continued)

(56) References Cited

U.S. PATENT DOCUMENTS 4,229,969 A * 10/1980 Hark ...................... G01M 10/00
4/491
4,406,162 A * 9/1983 Hark ...................... G01M 10/00
4/491
(Continued)

FOREIGN PATENT DOCUMENTS

| CN | 103072894 A | 5/2013 |
| CN | 204314069 U | 5/2013 |

(Continued)

*Primary Examiner* — Marrit Eyassu
(74) *Attorney, Agent, or Firm* — Muncy, Geissler, Olds & Lowe, PC

(57) ABSTRACT

The present invention belongs to the technical field of movement monitoring, and provides a video monitoring apparatus and method for an operating state of a wave maker. When the operating state of the wave maker is monitored, an image collected by a camera is subjected to mark point detection and a central position is computed. Then, the position of each mark point is tracked in a dynamic video; and the operating condition of each wave paddle is assessed according to the motion state of the mark point. In the present invention, operating monitoring of the wave paddle is independent of a wave making control system, and the operating condition of the wave paddle is monitored in real time through a non-contact image measurement mode. The wave paddle is identified through LED; the positions of the mark points in each frame image are acquired through image perspective correction and binarization analysis; and the operating state of the wave paddle is judged according to the contrast among the mark points at different times and (Continued)

different spatial positions, thereby effectively reducing an error rate of the wave making control system for the operating monitoring of the wave paddle and greatly increasing experimental efficiency of simulating wave making.

2 Claims, 1 Drawing Sheet

(51) Int. Cl.
  *B01L 3/00* (2006.01)
  *H04N 7/18* (2006.01)
  *H04L 12/24* (2006.01)
(52) U.S. Cl.
  CPC ............... *H04L 41/22* (2013.01); *H04N 7/18* (2013.01); *H04N 7/183* (2013.01)
(58) Field of Classification Search
  USPC .......................................................... 73/148
  See application file for complete search history.

(56) References Cited

U.S. PATENT DOCUMENTS

| 6,611,970 | B2* | 9/2003 | Back ....................... | A47K 3/10 |
| | | | | 4/491 |
| 2005/0018882 | A1* | 1/2005 | Muste ..................... | G01F 1/002 |
| | | | | 382/107 |
| 2011/0209280 | A1 | 9/2011 | Enjo | |
| 2013/0182904 | A1* | 7/2013 | Zhang ..................... | H04N 7/18 |
| | | | | 382/103 |

FOREIGN PATENT DOCUMENTS

| CN | 106403901 | A | | 6/2017 |
| CN | 106840110 | A | | 6/2017 |
| CN | 106851218 | A | | 6/2017 |
| JP | 2017209326 | A | * | 11/2017 |

* cited by examiner

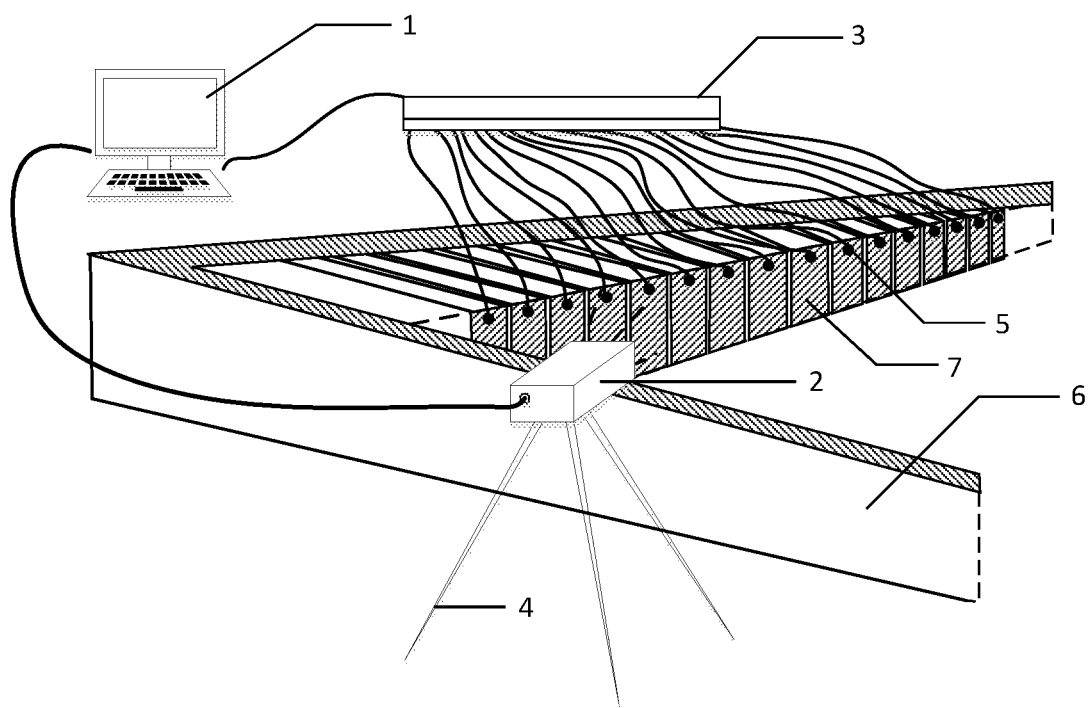

VIDEO MONITORING APPARATUS AND METHOD FOR OPERATING STATE OF WAVE MAKER

TECHNICAL FIELD

The present invention belongs to the field of movement monitoring, relates to a monitoring problem of an operating state of a wave paddle in a wave maker, and particularly relates to a video monitoring apparatus and method for an operating state of a wave maker.

BACKGROUND

In the research field of ocean engineering, either design of offshore oil drilling platforms, development of ocean power generation apparatuses or pavement of submarine pipelines and construction of marine safety engineering, the research phase of a laboratory is often indispensable, i.e., an experimental model is required to be placed in wave current tanks and pools for design verification. A wave maker is an essential experimental instrument device[1-4] in this process. The device can simulate many types of wave forms in the ocean within a limited space, and can provide a simulation environment of experimental verification for development of marine equipment.

In the process of simulating a wave, a plurality of wave paddles in a wave making system are synergistically controlled to move, thereby producing different wave forms. However, regardless of push paddle type wave making or shake paddle type wave making, the control principles are consistent: firstly, wave simulation parameters are set for a target spectrum; the host computer computes a control signal of a time sequential value for operating each wave paddle according to a transfer function of the system; and meanwhile, the signal is transmitted to a corresponding slave computer through a dedicated network. After the slave computer receives the control signal of the host computer, a wave making program is started to begin wave making. The slave computer converts the control signal of the time sequential value for operating each wave paddle into an irregular position pulse control signal through a dedicated motion control interface, outputs to a servo power supply and also drives a servo actuator to drive the wave paddle to make corresponding movement, thereby pushing a water body to produce waves. A servo motor encoder measures a motion track of a push paddle in real time, and feeds back to the servo power supply, so as to ensure that the wave push paddle can accurately track a computer-given signal for operation. The feedback signal is also fed back to the motion control interface. The slave computer can accordingly monitor the operating state of the wave paddle for inquiry by the host computer.

It is observed from the above operation mechanism of the wave maker that the moving mass of the wave paddle directly affects the quality of wave simulation and reasonableness of the wave making experiment. Meanwhile, it can be seen that when a failure occurs in operation of the wave paddle, a driver gives an alarm to the slave control computer, and the slave computer notifies the host computer of an error number while stopping the operation of the motor controlled by the computer. After the host computer receives the failure, all the slave computers are stopped and a failure type is displayed at the time of alarming. However, this is a failure processing manner under normal conditions. In a maritime engineering experiment, the wave maker is operated for a long time. Under some conditions, when the driver is damaged or a control program exits abnormally, the host computer cannot obtain an error message due to disconnection among programs of an application layer, but still can continue to make the waves. In this case, wave data in an experimental pool is not accurate; an experimental conclusion is invalid; and instant shutdown is needed. However, for the present wave making control system, a data transmission manner from the slave computer to the host computer through information feedback from the encoder or a displacement sensor is used. This failure feedback manner is completely integrated in a control loop. Once an abnormal situation appears, an experimenter controlling the host computer cannot obtain the failure message in time, causing a decrease of experimental efficiency. Thus, a monitoring method for the operating state of the wave maker is needed to test and assess an operating wave making state in real time. A video monitoring method not only is independent of the wave making control system, but also has the features of convenient installation, no contact and full-field measurement. Therefore, this method is suitable for monitoring in a wave making site.

REFERENCES

[1] Yang Hongqi, Li Muguo, Liu Shuxue, et al. Principle and Implementation of Active Absorbing Wave Maker Driven by Servo Motor in Flume. Journal of Dalian University of Technology, 2013, 53(3):423-428.
[2] Zhu Ping, Huang Jinghua, Zhao Lijun. Parameter Determination and Structure Design for Basin Wave Maker. Modern Electric Power, 2011, 28(4):44-48.
[3] Liu Shuxue, Wu Bin, Li Muguo, et al. Study on Irregular Active Absorbing Wave Maker System. Hydrodynamic Research and Progress, 2003, 18(5):532-539.
[4] Li Jun, Chen Gang, Yang Jianmin, et al. Simulation Method of Wave Generated by Two-Sided Segmented Wave Makers in Deep Ocean Basin. Ocean Engineering, 2011, 29(3):37-42.

SUMMARY

In view of a monitoring problem of an operating state of a wave making system in an ocean engineering laboratory, the present invention proposes a video monitoring method for an operating state of a wave maker by combining an image processing technology with movement track of a wave paddle.

The technical solution of the present invention is as follows:

A video monitoring apparatus for an operating state of a wave maker comprises a computer, a camera with a fixed focus lens, a tripod with a pan-tilt, some red round LEDs and a driving control circuit board, wherein the camera is fixed to the tripod with pan-tilt and arranged on the outer side of an experimental pool; an optical axis forms a certain angle with the movement direction of wave paddles and is connected with the computer through a transmission cable; a red round LED is arranged on each wave paddle in a visual region, and each LED is connected to the driving control circuit board; the driving control circuit board of the LED is connected with the computer through a RS232 interface; each wave paddle can be seen as a mark point; when the operating state of the wave maker is monitored, an image collected by the camera is subjected to mark point detection and a central position is computed; then, the position of each mark point is tracked in a dynamic video; and the operating condition of each wave paddle is assessed according to the motion state of the mark point.

A video monitoring method for an operating state of a wave maker comprises the following steps:

step A: fixing the position of the camera after installing the red round LEDs on the wave paddles so that the movement of the wave paddles and the optical axis of the camera form a certain angle; and adjusting an object distance and an aperture of a camera lens so that the images achieved are all very clear;

step B: performing system calibration during first operation; controlling the driving control circuit board by a PC to illuminate all the red round LEDs and simultaneously control the wave paddles to return to the initial position; achieving an image frame on the site by the camera; extracting coordinates $P_a$ of all luminous mark points in the initialization state of the wave paddles through an image binarization method; numbering the mark points in an order from near to far; next, controlling the wave paddles to move to a maximum stroke by the PC; grabbing the site image and extracting the coordinates $P_b$ of all the mark points; meanwhile, enabling the positions of the identified mark points to correspond to the numbers of the mark points; forming a line segment $P_a P_b^i$=1, 2, 3 ... N by two coordinate positions recorded under each number, where N is the quantity of the mark points; because the movement of each wave paddle is limited to the line segment, $P_a P_b^i$ is called as a stroke line segment; additionally, forming a straight line $l_a$ by a point set $P_a$ of the start positions and forming a straight line $l_b$ by a point set $P_b$ of the end positions; setting a region between $l_a$ and $l_b$ as an analysis region $W_{ROI}$; next, correcting the coordinates of the mark points in the image using perspective transformation $P'=M_{3\times3}P$ so that two straight lines formed by P' are parallel $l'_a // l'_b$, i.e., new motion line segments are equal to each other $|P'_a P'_b{}^1| = |P'_a P'_b{}^2| = \ldots = |P'_a P'_b{}^N|$; meanwhile, recording a perspective transformation matrix $M_{3\times3}$; P being a set of the coordinates of the mark points on $l_a$ and $l_b$; P' being a coordinate set of corrected points and $M_{3\times3}$ being the perspective transformation matrix; setting a two-dimensional coordinate plane with x axis coinciding with $l'_a$ and y axis coinciding with $P'_a P'_b{}^i$; and controlling the LED driving circuit board to close all the mark lamps by the PC to enter an analysis waiting state after completing the above operation;

step C: illuminating all the red round LEDs while starting a wave making procedure; and setting the camera to enter a uniformly-spaced consecutive collection mode;

step D: performing binarization analysis on the current image; extracting the positions of the mark points in the region $W_{ROI}$; and modifying the positions of the mark points using the perspective transformation matrix $M_{3\times3}$;

step E: contrasting the position of the current mark point with the previous position; recording the mark point of the number for the first time if the position is not changed; contrasting the position of each mark point at the current time with the position of an adjacent mark point along an axial direction; computing a position difference between the positions; and recording the mark point of the number for the second time if the difference between adjacent positions is greater than a set threshold T;

step F: considering the wave paddle of the number to have a failure if a certain mark point is recorded continuously twice; and also considering the wave paddles of the number successively adjacent thereto and only recorded for the first time to have a failure;

step G: displaying an alarm by the computer when the failure occurs; meanwhile closing the wave making procedure; then controlling the driving control circuit board to close all the mark lamps except the wave paddles with failure; and if no failure occurs, repeating steps D-E until a wave making experiment is completed, and closing all the mark lamps and stopping the monitoring procedure.

In conclusion, an LED mark point is installed in the same position of each wave paddle first before monitoring; then the camera is arranged and system calibration is conducted; next, automatic monitoring of the procedure is started; during measurement, the mark points are continuously detected and the positions of the mark points are acquired; and finally, the operating state of the wave paddle is judged according to relationships among the position of the current mark point, the position at the previous time and spatial adjacent positions.

The present invention has the beneficial effects: operating monitoring of the wave paddle is independent of a wave making control system, and the operating condition of the wave paddle is monitored in real time through a non-contact image measurement mode. The wave paddle is identified through LED; the positions of the mark points in each frame image are acquired through image perspective correction and binarization analysis; and the operating state of the wave paddle is judged according to the contrast among the mark points at different times and different spatial positions, thereby effectively reducing an error rate of the wave making control system for the operating monitoring of the wave paddle and greatly increasing experimental efficiency of simulating wave making.

DESCRIPTION OF DRAWINGS

The sole FIGURE is a structural schematic diagram of a video monitoring apparatus of the present invention.

In the FIGURE: 1 computer; 2 camera; 3 LED driving circuit board; 4 tripod; 5 LED; 6 experimental pool; and 7 wave paddle.

DETAILED DESCRIPTION

Specific embodiments of the present invention are further described below in combination with accompanying drawings and the technical solution.

A video monitoring method for an operating state of a wave maker, as shown in the sole FIGURE for the structure, comprises a computer 1; a camera 2 with a fixed focus lens; a tripod 4 with a pan-tilt; a plurality of LED circular lamp beads 5 and a driving control circuit board 3. The camera 2 is fixed to the tripod 4 and arranged on the outer side of an experimental pool 6; an optical axis forms a certain angle with the movement direction of wave paddles 7 and is connected with the computer 1 through a transmission conducting wire. A red round LED 5 is arranged on each wave paddle 7 in a visual region, and each LED is connected to the driving control circuit board 3. The driving control circuit board 3 of the LED is connected with the computer 1 through a RS232 interface. When the operating state of the wave maker is monitored, an image collected by the camera 2 is subjected to mark point detection and a central position is computed. Then, the position of each mark point is tracked in a dynamic video; and the operating condition of each wave paddle 7 is assessed according to the motion state of the mark point. The specific method is described as follows:

step A: fixing the shooting position of the camera 2 after installing the LEDs 5 on the wave paddles 7 so that the movement of the wave paddles 7 and the optical axis of the camera 2 form a certain angle; meanwhile, adjusting an object distance and an aperture of a camera lens so that the images achieved are all very clear;

step B: performing system calibration during first operation; controlling the LED driving control circuit board 3 by the computer 1 to illuminate all the LED mark lamps 5 and simultaneously control the wave paddles 7 to return to the initial position; achieving an image frame on the site by the camera 2; extracting coordinates $P_a$ of all luminous mark points 5 in the initialization state of the wave paddles 7 through an image binarization method; numbering the mark points 5 in an order from near to far; next, controlling the wave paddles 7 to move to a maximum stroke by the PC 1; grabbing the site image and extracting the coordinates $P_b$ of all the mark points 5; meanwhile, enabling the positions of the identified mark points to correspond to the numbers of the mark points; forming a line segment $P_a P_b^i = 1, 2, 3 \ldots N$ by two coordinate positions recorded under each number, wherein N is the quantity of the mark points; because the movement of each wave paddle is limited to the line segment, $P_a P_b^i$ is called as a stroke line segment; additionally, forming a straight line $l_a$ by a point set $P_a$ of the start positions and forming a straight line $l_b$ by a point set $P_b$ of the end positions; setting a region $W_{ROI}$ between $l_a$ and $l_b$ as an analysis region; next, correcting the coordinates of the mark points in the image using perspective transformation $P' = M_{3 \times 3} P$ (P being a set of the coordinates of the mark points on $l_a$ and $l_b$, P' being a coordinate set of corrected points and $M_{3 \times 3}$ being the perspective transformation matrix;) so that two straight lines formed by P' are parallel $l'_a // l'_b$, i.e., new motion line segments are equal to each other $|P'_a P'_b{}^1| = |P'_a P'_b{}^2| = \ldots = |P'_a P'_b{}^N|$; meanwhile, recording a perspective transformation matrix $M_{3 \times 3}$; setting a two-dimensional coordinate plane with x axis coinciding with $l'_a$ and y axis coinciding with $P'_a P'_b{}^i$; and controlling the LED driving circuit board 3 to close all the mark lamps by the PC 1 to enter an analysis waiting state after completing the above operation;

step C: illuminating all the red round LEDs 5 while starting a wave making procedure; and setting the camera 2 to enter a uniformly-spaced consecutive collection mode;

step D: performing binarization analysis on the current image; extracting the positions of the mark points 5 in the region $W_{ROI}$; and modifying the positions of the mark points using the perspective transformation matrix $M_{3 \times 3}$;

step E: contrasting the position of the current mark point with the previous position; at this moment, recording the mark point of the number for the first time if the position is not changed; contrasting the position of each mark point at the current time with the position of an adjacent mark point along an axial direction; computing a position difference between the positions; and at this moment, recording the mark point of the number for the second time if the difference between adjacent positions is greater than a set threshold T;

step F: considering the wave paddle 7 of the number to have a failure if a certain mark point 5 is recorded continuously twice; and also considering the wave paddles 7 of the number successively adjacent thereto and only recorded for the first time to have a failure;

step G: displaying an alarm by the computer when the failure occurs; meanwhile closing the wave making procedure; then controlling the LED driving control circuit board 3 to close all the mark lamps 5 except the wave paddles 7 with failure; and if no failure occurs, repeating steps D-E until a wave making experiment is completed, and closing all the mark lamps 5 and stopping the monitoring procedure.

In conclusion, an LED mark point 5 is installed in the same position of each wave paddle 7 first before monitoring; then the camera 2 is arranged and system calibration is conducted; next, automatic monitoring of the procedure is started; during measurement, the mark points 5 are continuously detected and the positions of the mark points 5 are acquired; and finally, the operating state of the wave paddle 7 is judged according to relationships among the position of the current mark point, the position at the previous time and spatial adjacent positions.

We claims:

1. A video monitoring apparatus for an operating state of a wave maker, the video monitoring apparatus comprising a computer, a camera with a fixed focus lens, a tripod with a pan-tilt, some red round LEDs and a driving control circuit board, wherein the camera is fixed to the tripod with pan-tilt and arranged on an outer side of an experimental pool; the camera has an optical axis and forms a certain angle with a movement direction of wave paddles and is connected with the computer through a transmission cable; a red round LED is arranged on each wave paddle in a visual region, and each LED is connected to the driving control circuit board; the driving control circuit board of the LED is connected with the computer through a RS232 interface; each wave paddle is seen as a mark point; when the operating state of the wave maker is monitored, an image collected by the camera is subjected to mark point detection and a central position is computed by image moments; then, the central position of every mark point are being tracked in a dynamic video by nearest neighbor tracking; and the operating state of each wave paddle is assessed according to a motion state of the corresponding mark point.

2. A video monitoring method for an operating state of a wave maker, comprising the following steps:
   step A: fixing a position of a camera after installing red round LEDs on wave paddles so that movement of the wave paddles and an optical axis of the camera form a certain angle; and adjusting an object distance and an aperture of a camera lens so that images achieved by the camera are all very clear;
   step B: performing system calibration during first operation; controlling a driving control circuit board by a PC to illuminate all the red round LEDs and simultaneously control the wave paddles to return to an initial position; achieving an image frame of wave paddles by the camera; extracting coordinates $P_a$ of all luminous mark points in an initialization state of the wave paddles through an image binarization method; numbering the mark points in an order from near to far; next, controlling the wave paddles to move to a maximum stroke by the PC; grabbing the wave paddle image and extracting coordinates defined as $P_b$ of all the mark points; meanwhile, enabling the positions of identified mark points to correspond to indexes of the mark points; forming a line segment $P_a P_b^i$, i=1, 2, 3 . . . N by two coordinate positions recorded under each number, where N is the quantity of the mark points; because the movement of each wave paddle is limited to the line segment, $P_a P_b^i$ is called as a stroke line segment; additionally, forming a straight line $l_a$ by a point set $P_a$ of start positions and forming a straight line $l_b$ by a point set $P_b$ of end positions; setting a region between $l_a$ and $l_b$ as an analysis region $W_{ROI}$; next, correcting the coordinates of the mark points in the image using perspective transformation $P' = M_{3 \times 3} P$ so that two straight lines formed by P' are parallel $l_a' // l_b'$, i.e., new motion line segments are equal to each other $|P'_aP'^1_b|=|P'_aP'^2_b|= \ldots |P'_aP'^N_b|$; meanwhile, recording a perspective transformation matrix $M_{3\times3}$; P being a set of the coordinates of the mark points on $l_a$ and $l_b$; P' being a coordinate set of corrected points and $M_{3\times3}$ being the perspective transformation matrix; setting a two-dimensional coordinate plane with x axis coinciding with $l_a'$ and y axis coinciding with $P'_aP'^i_b$; and controlling the LED driving circuit board to close all the mark LED by the PC to enter an analysis waiting state after completing the above operation;

step C: illuminating all the red round LEDs while starting a wave making procedure; and setting the camera to enter a uniformly-spaced consecutive collection mode;

step D: performing binarization analysis on a current image captured by the camera; extracting the positions of the mark points in the region $W_{ROI}$; and modifying the positions of the mark points using the perspective transformation matrix $M_{3\times3}$;

step E: contrasting the position of the current mark point with the previous position; recording the index of the mark point for the first time if the position is not changed; contrasting the position of each mark point at the current time with the position of an adjacent mark point along an axial direction; computing a position difference between the positions; and recording the mark point of the number for the second time if the difference between adjacent positions is greater than a set threshold T;

step F: considering the wave paddle with the same index in step E to have a failure if a certain mark point is recorded continuously twice; and also considering the adjacent wave paddles and only recorded for the first time to have a failure;

step G: displaying an alarm by the computer when the failure occurs; meanwhile closing the wave making procedure; then controlling the driving control circuit board to close all the mark lamps except the wave paddles with failure; and if no failure occurs, repeating steps D-E until a wave making experiment is completed, and closing all the mark lamps and stopping the monitoring procedure.

* * * * *